United States Patent [19]

Holzhauer et al.

[11] Patent Number: 5,675,521
[45] Date of Patent: Oct. 7, 1997

[54] MULTICHIP MODULE ANALYZER

[75] Inventors: Douglas J. Holzhauer, Whitesboro; Dale W. Richards, Rome, both of N.Y.; Ian R. Grosse, S. Deerfield, Mass.; Daniel D. Corkill, Hadley, Mass.; Prasanna Katragadda, Burlington, Mass.

[73] Assignee: The United States of America as represented by the Secretary of the Air Force, Washington, D.C.

[21] Appl. No.: 434,426

[22] Filed: May 2, 1995

Related U.S. Application Data

[63] Continuation of Ser. No. 197,642, Feb. 11, 1994, abandoned.

[51] Int. Cl.$^6$ .................................................. G06F 9/455
[52] U.S. Cl. ............................ 364/578; 395/500; 395/53; 395/10
[58] Field of Search .......................... 364/578; 395/500, 395/53, 600, 10, 50, 51, 54, 60

[56] References Cited

U.S. PATENT DOCUMENTS

| | | | |
|---|---|---|---|
| 4,649,515 | 3/1987 | Thompson et al. | 364/900 |
| 4,713,775 | 12/1987 | Scott et al. | 364/513 |
| 4,912,664 | 3/1990 | Weiss et al. | 364/577 |
| 5,010,501 | 4/1991 | Arakawa | 364/522 |
| 5,016,204 | 5/1991 | Simoudis et al. | 364/578 |
| 5,025,392 | 6/1991 | Singh | 364/513 |
| 5,101,362 | 3/1992 | Simoudis | 395/53 |
| 5,195,095 | 3/1993 | Shah | 371/15.1 |
| 5,202,843 | 4/1993 | Kunimine et al. | 364/578 |
| 5,214,752 | 5/1993 | Meshka et al. | 395/123 |

OTHER PUBLICATIONS

Ian R. Grosse, Prasanna Katragadda, and Anagha Jog; Knowledge Sources for an Intelligent MCM Analyzer; RL-TR-93-123 Final Tech Report, Jun. 1993.

D. Holzhauer, D. Richards, P. Rocci, M. Stoklosa, P. Yaworsky, I Grosse, D. Corkill; Designing Reliability into Multichip Modules; An Intelligent Modeling Approach; AIAA 93-1022, Aerospace Design Conf.

Prasanna Katragadda, Sandeepan Bhattacharya, Ian R. Grosse; A Computer-Aided Tool for Multichip Module Package Design; IEEE International Conf.

Ian R. Grosse, Daniel D. Corkill; A Blackboard Based Approach to Intelligent Finite Element Modeling and Analysis; Computers on Engineering, vol. 2, 1992, pp. 66–68.

Katragadda et al., "A Computer Aided Tool for Multichip Module Package Design", Wafer Scale Int., pp. 92–105 Jan. 1994.

Shi et al., "A Tool for building Decision-Support-Oriented Expert Systems", Tools for Artificial Intelligence, pp. 537–543 Jan. 1990.

Silverman et al., "Blackboard System Generator (BSG)", IEEE Transactions on Systems, Man & Cybernetics, pp. 334–355 Mar. 1989.

*Primary Examiner*—James P. Trammell
*Assistant Examiner*—Patrick J. Assouad
*Attorney, Agent, or Firm*—William G. Auton; Harold L. Burstyn

[57] ABSTRACT

The disclosure describes a method for performing thermal reliability analysis of electronic devices such as multichip modules. The method supports the reliabilty of multichip technology during the design phase by integrating traditional thermal analysis techniques, such as Finite Element Analysis with artificial intelligence techniques. Specifically, the use of object oriented programming, blackboard architecture and knowledge sources (based on expert systems) allow the computer to perform lower level reasoning associated with the development of the finite element mesh. The use of software, called Intelligent Multichip Module Analyzer, results in a great reduction in the amount of time required to model and to perform thermal analysis of multichip modules. This allows the analysis to be integrated with the design process so that reliability assessment can be accomplished when it can best affect the final design.

6 Claims, 2 Drawing Sheets

MULTICHIP MODULE ANALYZER

CROSS REFERENCE TO RELATED APPLICATION

This application is a continuation of application Ser. No. 08/197,642 filed on 11 Feb. 1994 now abandoned.

STATEMENT OF GOVERNMENT INTEREST

The invention described herein may be manufactured and used by or for the Government for governmental purposes without the payment of any royalty thereon.

BACKGROUND OF THE INVENTION

The purpose of this invention is to automate and optimize the modeling and analysis processes associated with the thermal reliability evaluation of electronic devices.

The invention is for a method for performing thermal reliability analysis of electronic devices such as multichip modules. The method supports the reliabilty of multichip technology during the design phase by integrating traditional thermal analysis techniques, such as Finite Element Analysis, with artificial intelligence techniques. Specifically, the use of object oriented programming, blackboard architecture and knowledge sources (based on expert systems) allow the computer to perform lower level reasoning associated with the development of the finite element mesh. The use of software, called Intelligent Multichip Module Analyzer, results in a great reduction in the amount of time required to model and to perform thermal analysis of multichip modules. This allows the analysis to be integrated with the design process so that reliability assessment can be accomplished when it can best affect the final design.

Many electronic devices generate a significant amount of heat as a by-product of their operation. Proper dissipation of this heat is critical to the longevity of the devices. The quality of a new design of an electronic device can be determined by modeling the thermal behavior of the design. Finite element analysis (FEA) is a widely used numerical method for obtaining approximate solutions describing heat flow and strain distribution in a physical body. This process is very structured, requiring extensive user-interaction at many intermediate steps.

Use of the FEA method involves the generation of a geometric representation or numerical model of the physical device. This modeling portion is the most labor intensive task associated with the thermal reliability assessment of the device and the most influential activity regarding the accuracy and correctness of the results. The generated model is then used to develop a set of equations describing some form of natural law, e.g., conservation of energy, applied to that model. Solving the equations yields a description of the behavior of the device, including thermal profiles and the stresses and strains associated with the temperature distribution. These results must then be checked by the design engineer to determine if they are sufficiently accurate. If the accuracy is insufficient, the whole model building and analysis process must be repeated and refined until the accuracy is acceptable.

Current implementations provide no capability to selectively increase the finite element density of the model in areas of poor accuracy. After an initial coarse analysis of the entire device is completed, sub-models of particular areas of the device may then be analyzed in greater detail by using the boundary conditions resulting from the initial analysis. This sub-model must also be custom built, and it is subject to the same deficiencies with the initial model. Once sufficiently accurate results are obtained, the resulting strains and stresses can be used to determine the reliability for the particular component. In order to properly perform this type of analysis, the engineer must have a detailed and comprehensive knowledge of FEA, the specific design being analyzed and the general class of devices to which that design belongs.

SUMMARY OF THE INVENTION

This invention, an Intelligent Thermal Analyzer (ITA), is an automated process which allows the user to enter primary data about the device being designed, while the type of analysis, mesh density and type of reliability prediction to be used are automatically determined, and a thermal reliability analysis subsequently performed. Temperature contours and the reliability of the various components of the device are results of this automated process.

The Intelligent Thermal Analyzer (ITA) is a software tool that is an outgrowth of the experience gained from using the conventional FEA analysis methods of the prior art described above. The iterative refinement of the accuracy of the analysis and the recursive selection and modeling and analysis of portions of the design indicated that the entire process could be automated. This idea was additionally influenced by other similar work in the area of using expert systems for the thermal analysis of printed circuit boards. That use of expert systems allowed the user to concentrate on higher level reasoning decisions and allowed the software to do the detailed analytical work. Our approach includes the use of a blackboard based data representation and reasoning approach, e.g., Generic Black Board (GBB), which allows for simultaneous and asynchronous application of various areas of expertise (supplied through separate routines known as knowledge sources) to the process, and the use of an automatic error assessment and remeshing algorithm.

BRIEF DESCRIPTION OF THE DRAWINGS

These and other advantages, objects and features of the invention will become more apparent after considering the following description taken in conjunction with the illustrative embodiment in the accompanying drawings, in which.

DESCRIPTION OF THE PREFERRED EMBODIMENT

Figure 1:
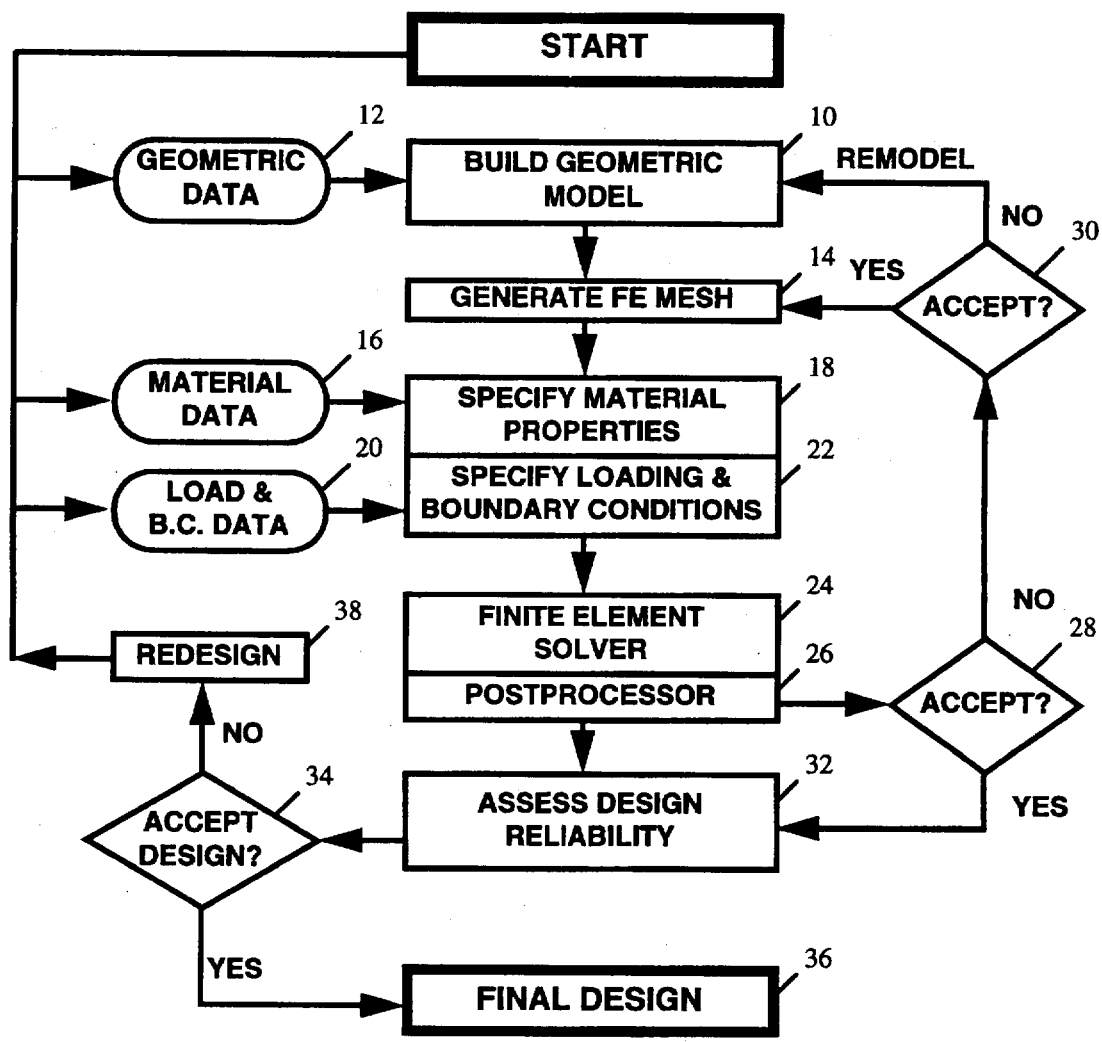
FIG. 1 is a schematic flow diagram of the presently known method over which this invention is an improvement.

Refer first to the prior art Finite Element Analysis (FEA) method shown in FIG. 1. This FEA method starts with the building of a Geometric Model (block 10) from the geometric data generated in block 12 and representing the geometric configuration of an electronic device being designed. Thereafter, with the data from the geometric model (block 10) an FE mesh is generated in block 14. Material data (block 16) and the generated FE mesh are then used to specify the material properties. The specified material properties (block 18) along with load and B.C. Data (block 20) are then used to specify loading and boundary conditions. The generated loading and boundary conditions are then outputted to a finite element solver (block 24) where a preliminary design of the device is generated.

The design is then applied to a post processor (block 26) where the design is analyzed. The next step is to determine acceptability of the design (block 28). If the design is acceptable (YES), design reliability is assessed (block 32). If the design is not acceptable (NO), a decision is made as to whether to Remesh (block 30). If the decision is to Remesh, YES, the geometric model is remeshed (block 14). If the decision is not to remesh (NO), the geometric model must be remodeled (block 10), and the process repeated until an acceptable finite element is generated (block 24).

If the finite element is accepted, YES, (block 28) then the next step is to assess design reliability (block 32). If acceptable, YES (block 34), the final design (block 36) is concluded. If NO (block 3) the element is redesigned (block 38) and the whole process is reiterated.

The prior art method of FIG. 1 is very structured, requiring extensive user-interaction at many intermediate steps. The method involves the generation of a geometric representation or numerical model of the physical system. This modeling portion is the most labor intensive task associated with the thermal reliability assessment of the device and the most influential activity regarding the accuracy and correctness of the results. The generated model is then used to develop a set of equations describing some form of natural law, e.g., conservation of energy, applied to that model. Solving the equations yields a description of the behavior of the physical system, including thermal profiles and the stresses and strains associated with the temperature distribution. These results must then be checked by the design engineer (block 32) to determine if they are sufficiently accurate. If the accuracy is insufficient, the whole model building and analysis process must be repeated and refined until the accuracy is acceptable. Current implementations provide no capability to selectively increase the finite element density of the model in areas of poor accuracy. After an initial coarse analysis of the entire device is completed, sub-models of particular areas of the device may then be analyzed in greater detail by using the boundary conditions resulting from the initial analysis. This sub-model must also be custom built, and it is subject to the same deficiencies with the initial model. Once sufficiently accurate results are obtained, the resulting strains and stresses can be used to determine the reliability for the particular component. In order to properly perform this type of analysis, the engineer must have a detailed and comprehensive knowledge of FEA, the specific design being analyzed and the general class of devices to which that design belongs.

Figure 2:
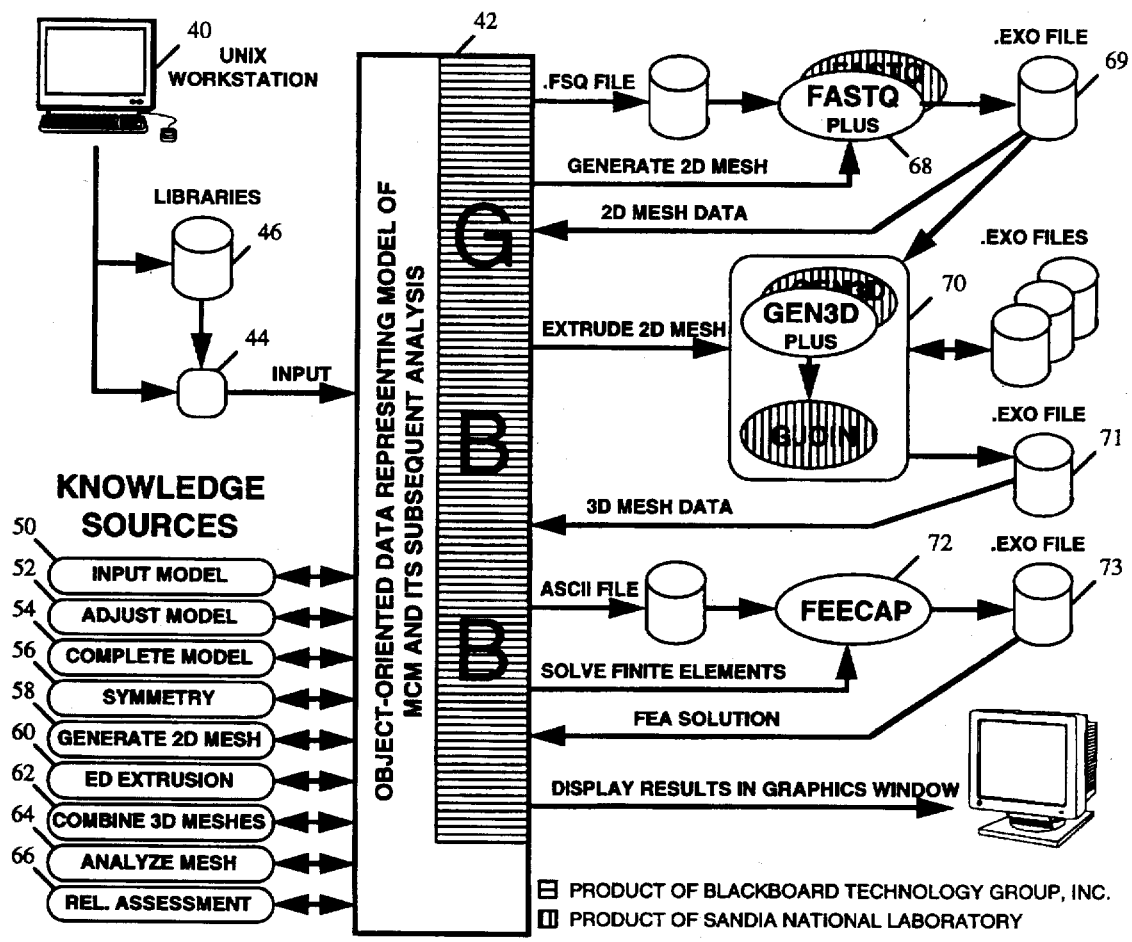
FIG. 2 is a schematic flow diagram of the preferred embodiment of this invention.

On the other hand, the operation of the Intelligent Thermal Analyzer method shown in FIG. 2 revolves around the use of a common, object-oriented database to represent both the descriptive and analytical data associated with the analysis. By allowing only one representation, the Analyzer ensures that consistent source information is used throughout the entire process.

A description of the device to be analyzed is input from a computer terminal 40 to an object oriented data base 42, either directly through input terminal 44 or by referencing a previously stored text file from a library 46. Thus, an internal representation of the device is created. The architecture of the object oriented database 42 which is utilized is that associated with the blackboard problem-solving paradigm, specifically that employed by the Generic Blackboard (GBB), a product from Blackboard Technology, Inc.

The analysis expertise is embodied in several software modules or Knowledge Sources, written using either the CLIPS expert system shell or the languages C or FORTRAN. This approach allows for independent and concurrent interaction between the various knowledge sources, and it optimizes the analysis, taking into account the various and sometimes conflicting nature of design requirements At this point, several independent software modules (the Knowledge Sources 50–66 interact with the database 42 to complete the analysis. These modules are structured so as to be involved only when sufficient conditions have been met and they contain little or no local data, all results being returned to the common database. Even filenames for large external files are stored in the database where they may be accessed by any of the other knowledge sources.

A typical sequencing of knowledge source interactions with the database is as follows: The input-model Knowledge Source 50 controls the input of the device description from the terminal. The adjust-model-Knowledge Source 52 makes simplifying assumptions about the geometry to reduce the amount of calculations necessary. The complete-model-Knowledge Source 54 adds additional information necessary for analysis, but not explicitly included in the input data. This is either derived from the input data or is generated based on knowledge of the domain. The symmetry-Knowledge Source 56 makes additional simplifying assumptions about the geometry. The generate-mapmesh-regions-Knowledge Source and generate-2D-mesh-Knowledge Source 58 creates several 2 dimensional models representing the device in whole. Use is mad of FASTQ, a mesh generation tool 68. The extrude-component-Knowledge Source 60 then builds a 3D-model for each 2D model using GEN3D, a 3D-extrusion tool 70. The combine-3d-meshes-Knowledge Source 62 then merges these 3D-models into a single inclusive 3D-model using GJOIN, another model manipulation tool 74. The analyze-3d-mesh-Knowledge Source 64 invokes the equation solver 72, a FEECAP, to determine the thermal response and then draws a false-color plan view of the resulting temperature profile of the device. The reliability-assessment-Knowledge Source 66 evaluates thermal stress and strain and determines the reliability of the device. The results are then displayed on a monitor 74.

This invention greatly reduces the time necessary to perform a thermal reliability analysis of a design. Research has indicated that approximately 55% of the manpower expended on a reliability analysis of a typical electronics design is used on the modeling of the device, upward of 200 hours for an experienced engineer assuming that multiple models have to made to obtain accurate results. The Intelligent Thermal Analyzer would reduce the modeling time to approximately 45 hours. This would include the error assessment and remodeling to obtain accurate results. This invention automatically performs error assessment and remeshing, a capability not currently available to engineers, forcing them to manually compare the temperature or strain level between adjacent elements. If a poor accuracy is indicated, the model has to be remeshed again, a task not currently automated. The embedding of expert knowledge into the process will enable engineers lacking thermal analysis training to properly evaluate the reliability of new device designs. The simultaneous interaction of the various area of expertise, i.e., Knowledge Sources, optimizes the contribution of each knowledge source in a manner that reduces the overall amount of computation required for the assessment.

Recapitulating, this invention is an automated approach for assessing the thermal reliability of the design of an electronics device. Modern electronics devices are often required to dissipate a relatively large amount of heat within a small volume under severe material constraints. Electronics' miniaturization precludes extensive measurement of temperature, and the cost of manufacturing requires that the design be proven reliable during the design phase. The prior art approach utilizes both numerical analysis techniques and generic design guidelines to ensure thermal reliability. However, it requires excessive time and expertise to develop the models used for numerical analysis, no check is made of the numerical accuracy of that model or of the analysis results, information exchange between analysis subprocesses is poor at best, and much of the data entry is either redundant or performed manually.

This invention addresses the deficiencies by defining an accurate, consistent and efficient analysis and assessment process. The time-consuming bottleneck of modeling is automated, numerical errors associated with the analysis process are accounted for, and a maximum use is made of simplifying assumptions that support the end goal of reliability assessment as compared to precise thermal simulations. The process utilizes an object-oriented representation of both the physical system characteristics and the resulting analysis data. Generic modeling/analysis/assessment tasks are implemented by application-domain specialized software modules. Error data is used to iteratively refine the model, and progressive sub-modeling is used to achieve the required resolution without requiring a detailed model of the entire device.

The invention consists of a single common database 42 of device-descriptive data and various symbolic and numerical software modules 50-56 containing a specific information regarding the analysis process. The object oriented database 42 architecture utilized is that associated with the blackboard problem-solving paradigm, specifically that employed by the Generic Blackboard (GBB), a product from Blackboard Technology, Inc. The analysis expertise is embodied in several software modules (Knowledge Sources 50-66), written using either the CLIPS expert system shell or the languages C or FORTRAN. This approach allows for independent and concurrent interaction between the various knowledge sources. This optimizes the analysis, taking into account the various and sometimes conflicting nature of design requirements. It is common in the design of a thermal analysis model to have conflicting goals which can here be represented by independent Knowledge Sources. GBB supports the interfacing of these Knowledge Sources, thereby optimizing the analysis process. Particular characteristics of this invention are:

1. Automatic optimization of the numerical simulation to obtain high accuracy.
2. Simultaneous and asynchronous interaction between the problem representation located on the blackboard (GBB) and the various Knowledge Sources.
3. Encapsulation of expert knowledge in the area of design and failure mechanisms peculiar to a particular class of electronic devices.
4. Higher order reasoning about the analysis in order to optimize the model design.

This invention was first applied to the domain of multichip modules (MCM). Multichip modules are advanced hybrid circuits consisting of a complex assortment of even smaller units, e.g., integrated circuits, assembled together and interconnected within a single package—itself a complex design item. Some MCM contain up to 100 such circuits. Because of the complexity and cost of MCMs, a capability to make rapid and accurate reliability assessments is needed. This invention automates what is currently an iterative time-consuming job requiring a large amount of human interaction and technical expertise.

STEP BY STEP INSTRUCTIONS FOR CARRYING OUT THE PROCESS

First, the user must have available the following tools or other means to provide the related capability:

1. Blackboard Framework/Object oriented Database (42);
2. 2D Modeler/Mesh Generator (68);
3. 3D Mesh Extruder (70);
4. Finite element Solver (72).

In addition, a capability must be available, either automated or manual for:

5. Identifying the geometry and other characteristics of the module being analyzed (50);
6. Determining the existing of symmetry in a 2D drawing (56);
7. Combining several, separate 3D models into a single 3D model (62);
8. Inferring the thermal reliability of a multichip module from its temperature distribution (66).

Only one single, object oriented representation of the entire problem may exist in the Blackboard 42 at any one time. All new data, after the initial data input stage is derived, inferred, extracted or generated from a combination of existing data objects and the values, and knowledge about the multichip module analysis process (contained in the Knowledge Sources 50-66.

The user proceeds as follows:

1. Define the multichip modules in terms of its geometry, material composition, heat generation/power consumption. ambient conditions and any boundary conditions that may be present (Input model source 50.) This information may describe a new design in the computer 40 or one for which such data has been previously defined in the Libraries 46.
2. Create abstract data objects to represent the various component of the multichip module, the material involved and areas of heat generation (from the computer input 44 and the Blackboard 42).
3. Assign to these data objects (in the input model knowledge source 50) the appropriate values, as defined in step 1.
4. In the Adjust model Knowledge Source 52, adjust the size and location of the components to reduce the complexity of the geometry, e.g., so that the co-linearity of component edges is maximized, and update the object data base (Blackboard 42).
5. In the Knowledge Source 54, infer additional data, e.g., a component is located with the space occupied by another component, and annotate the Blackboard data base 42 accordingly.
6. In Knowledge Source 56, further reduce the magnitude of the problem by identifying occurrences of symmetry, e.g. quarter, half, so that only a subsection of the model will need to be analyzed.
7. In the knowledge source 58 and the FASTQ plus 68, create a set of 2D regions representing the physical space of the module (or its subsection) being analyzed, and store the results in an EXO file 69, and by annotating back to the object database 42.
8. Mesh the model by subdividing the regions defined by the existing regions into 2D finite elements, taking into account the need for numerical resolution (quantity of elements) and the need for numerical accuracy (aspect ratio of elements) using knowledge source 58 and the FASTQ plus 68, then storing the resulting 2D meshes in both a specific file 69, and by annotating appropriate data back to the Blackboard eject database 42.
9. Extrude each of the 2D meshes into a single 3D mesh in the third dimension as defined by the input from knowledge source 60 and Gen3D 70, and store the resulting 3D meshes in both a specific file 71 and by annotating the appropriate data back to the object database 42.

10. Using knowledge Source 64 and the GEN3D 72, combine all of the 3D meshes into a single 3D mesh, and then store the resulting 3D mesh in both a specific file 71 and annotate the appropriate data back to the object database 42.

11. Use a finite element solver (Knowledge Source 62 and FEECAP 72) to determine the resulting temperatures and strains at node points through the multichip model along with the accuracy of the values, and then store the resulting values in both a specific file 73 and by annotating appropriate data back to the object database 42.

12. Evaluate the sufficiency of accuracy of these results in the knowledge source 64. If insufficient, go to step 8, and adjust the meshing and repeat steps 9 to 12.

13. Based on known failure modes from Knowledge Source 66, and material behavior, assign a value to the reliability of the proposed design.

Although the invention has been described with reference to a particular embodiment, it will be understood to those skilled in the art that the invention is capable of a variety of alternative embodiments within the spirit and scope of the appended claims.

What is claimed is:

1. An intelligent thermal analyzer method for analyzing the thermal characteristics of an electronic device, said method comprising:

inputting a graphic model of the electronics device into an object template of a generic blackboard, said model comprising four basic components of said device, including a package, substrate, interconnect and chip;

providing a plurality of knowledge sources, said knowledge sources including a symmetry knowledge source, model source and an extrusion source, each of said knowledge sources having an output to said generic blackboard;

activating the symmetry knowledge source to provide an input to said generic blackboard to generate new descriptions of said model representing a plurality of parts of the model to be analyzed, said parts each constituting a subset of said model;

providing an output from said model source to said blackboard, to generate a two dimensional geometric model of the subsets of said device;

applying an output from said extrusion source to form three dimensional geometric models of said subsets of said device;

then combining said subsets to create a finite element analysis code; and displaying said finite element analysis code.

2. The method of claim 1 wherein said extrusion source chooses the two dimensional area for each object sequentially, and then, based on embedded knowledge, determines the height of each object and the mesh density in the vertical direction.

3. The method of claim 1 wherein said extrusion source contains data which includes characteristics of the device such as thickness and probable flaws.

4. An intelligent thermal analyzer method for analyzing the thermal characteristics of an electronic device, such as a multichip module, said method comprising:

determining possible failure mechanisms of said electronics device;

developing a finite element model in accordance with the following steps:

inputting a graphic model of the electronics device into an object template of a generic blackboard, said model comprising four basic components of said device, including a package, substrate, interconnect and chip;

providing a plurality of knowledge sources, said knowledge sources including a symmetry knowledge source, model source and an extrusion source, each of said knowledge sources having an output to said blackboard;

activating the symmetry knowledge source to provide an input to said generic blackboard to generate new descriptions of said model representing a plurality of parts of the model to be analyzed, said parts each constituting a subset of said model;

providing an output from said model source to said blackboard, to generate a two dimensional geometric model of the subsets of said device;

applying an output from said extrusion source to form three dimensional geometric models of said subsets of said device;

then combining said subsets to create a finite element analysis code; and displaying said finite element analysis code.

5. An intelligent thermal analyzer method for analyzing the thermal characteristics of an electronic device, such as a multichip module, said method comprising the steps of:

a. defining said multichip modules in terms of its geometry, material composition, heat generation/power consumption, ambient conditions and any boundary conditions that may be present (Input model source 50);

b. creating abstract data objects to represent the various component of the multichip module, the material involved and areas of heat generation (from the computer input 44 and an object data base (42);

c. assigning to said data objects (in the input model knowledge source 50) the appropriate values, as defined in step a;

d. adjusting the size and location of the components to reduce the complexity of the geometry (in the Knowledge Source 52), and update the object data base (42);

e. inferring additional data, and annotating database 42 accordingly (in the Knowledge Source 54);

f. further reducing the magnitude of the problem by identifying occurrences of symmetry (in Knowledge Source 56), so that only a subsection of the model will need to be analyzed;

g. creating a set of 2D regions representing the physical space of the module (or its subsection) being analyzed (in the knowledge source 58 and the FASTQ plus 68), and storing the results in a file (69) and by annotating the appropriate data back to the object database 42;

h. meshing the model by subdividing the regions defined by the existing regions into 2D finite elements, taking into account the need for numerical resolution and the need for numerical accuracy (using knowledge source 58 and the FASTQ 68) and then storing the resulting 2D meshes in both a file (69), and by annotating appropriate data back to the object database 42;

i. extruding each of the 2D meshes into a single 3D mesh in the third dimension as defined by the input from a knowledge source 60 and a Gen3D (70) and storing the resulting 3D meshes in both a specific file (71) and by annotating the appropriate data back to the object database (42);

j. combining all of the 3D meshes into a single 3D mesh, (using knowledge source 64 and GEN3D 72) and then storing the resulting 3D mesh in both a specific file (71) and annotating the appropriate data back to the object database (42);

k. determining the resulting temperatures and strains at node points through the multichip model, (using a finite element solver (62) and a FEECAP 72), along with the accuracy of the values, and the storing the resulting values in both a specific file (73) and annotating appropriate data back to the object database (42);

l. evaluating the sufficiency of accuracy of these results in the knowledge source 64. and if insufficient, going to step 8, and repeating steps 8 to 12; and m. based on known failure modes from Knowledge Source 66, and material behavior, assigning a value to the reliability of the proposed design.

6. In an intelligent thermal analyzer, having the following tools and other means to provide the related capability:

a blackboard framework/Object oriented Database (42);

a 2D Modeler/Mesh Generator (68);

a 3D Mesh Extruder (70);

a finite element Solver (72);

means for identifying the geometry and other characteristics of the module being analyzed (50);

means for determining the existing of symmetry in a 2D drawing (56);

means for combining several, separate 3D models into a single 3D model (62); and means for inferring the thermal reliability of a multichip module from its temperature distribution (66);

a method for analyzing the thermal characteristics of an electronic device, such as a multichip module, said method comprising the steps of:

a. defining said multichip module in terms of its geometry, material composition, heat generation/ power consumption, ambient conditions and any boundary conditions that may be present (Input model source 50);

b. creating abstract data objects to represent the various component of the multichip module, the material involved and areas of heat generation (from the computer input 44 and an object data base (42);

c. assigning to said data objects (in the input model knowledge source 50) the appropriate values, as defined in step 1;

d. adjusting the size and location of the components to reduce the complexity of the geometry (in the Knowledge Source 52), and updating the object data base (42);

e. inferring additional data, and annotating database 42 accordingly (in the Knowledge Source 54);

f. further reducing the magnitude of the problem by identifying occurrences of symmetry (in Knowledge Source 56), so that only a subsection of the model will need to be analyzed;

g. creating a set of 2D regions representing the physical space of the module (or its subsection) being analyzed (in the knowledge source 58 and the FASTQ plus (68), and storing the results in a file (69) and by annotating the appropriate data back to the object database (42);

h. meshing the model by subdividing the regions defined by the existing regions into 2D finite elements, taking into account the need for numerical resolution and the need for numerical accuracy (using knowledge source 58 and the FASTQ 68) and then storing the resulting 2D meshes in both a file (69), and by annotating appropriate data back to the object database 42;

i. extruding each of the 2D meshes into a single 3D mesh in the third dimension as defined by the input from a knowledge source 60 and a Gen3D (70) and storing the resulting 3D meshes in both a specific file (71) and by annotating the appropriate data back to the object database (42);

j. combining all of the 3D meshes into a single 3D mesh, (using knowledge source 64 and GEN3D 72) and then storing the resulting 3D mesh in both a specific file (71) and annotating the appropriate data back to the object database (42);

k. determining the resulting temperatures and strains at node points through the multichip model, (using a finite element solver (62) and a FEECAP 72), along with the accuracy of the values, and the storing the resulting values in both a specific file (73) and annotating appropriate data back to the object database (42);

l. evaluating the sufficiency of accuracy of these results in the knowledge source 64 and if insufficient, going to step 8, and repeating steps 8 to 12; and m. based on known failure modes from Knowledge Source 66, and material behavior, assigning a value to the reliability of the proposed design.

* * * * *